United States Patent
Becerra et al.

(10) Patent No.: US 6,423,118 B1
(45) Date of Patent: Jul. 23, 2002

(54) METHODS AND SYSTEMS FOR CONTROLLING AIR FILTRATION SYSTEMS

(75) Inventors: Roger C. Becerra; Brian L. Beifus; William R. Archer, all of Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 24 days.

(21) Appl. No.: 09/655,657

(22) Filed: Sep. 5, 2000

(51) Int. Cl.$^7$ ................................................ B01D 46/46
(52) U.S. Cl. ...................... 95/19; 95/22; 95/23; 96/397; 96/417
(58) Field of Search ................................ 95/25, 22, 19, 95/23; 96/FOR 170, 417, 397

(56) References Cited

U.S. PATENT DOCUMENTS

| | | | |
|---|---|---|---|
| 2,853,155 A | * | 9/1958 | Peter |
| 4,461,633 A | | 7/1984 | Bodovsky |
| 4,921,509 A | | 5/1990 | Maclin |
| 5,096,474 A | * | 3/1992 | Miller, Jr. et al. |
| 5,421,844 A | | 6/1995 | Chiu |
| 5,433,762 A | | 7/1995 | Chiu |
| 5,461,368 A | * | 10/1995 | Comer |
| 5,810,908 A | * | 9/1998 | Gray et al. |
| 5,856,198 A | | 1/1999 | Joffe et al. |
| 6,030,437 A | * | 2/2000 | Gourrier et al. |
| 6,036,757 A | * | 3/2000 | Gatchell et al. |
| 6,168,646 B1 | * | 1/2001 | Craig et al. |

FOREIGN PATENT DOCUMENTS

| | | | |
|---|---|---|---|
| JP | 60-147210 | * | 8/1985 |
| JP | 60-147212 | * | 8/1985 |
| JP | 5-154323 | * | 6/1993 |

* cited by examiner

Primary Examiner—Duane S. Smith
(74) Attorney, Agent, or Firm—Karl Vick, Esq.; Damian Wasserbauer, Esq.; Armstrong Teasdale LLP

(57) ABSTRACT

Methods and control systems for improving performance in an air filtration system are disclosed. The method includes monitoring performance of a blower motor in the air filtration system and adjusting blower motor torque based upon a measured airflow or a measured static air pressure within the air filtration system.

23 Claims, 2 Drawing Sheets

METHODS AND SYSTEMS FOR CONTROLLING AIR FILTRATION SYSTEMS

BACKGROUND OF THE INVENTION

This invention relates generally to air flow in air filtration systems and more specifically to methods and systems for improving performance of air filtration systems.

Air filtration systems are driven by relatively constant speed motors, for example, induction motors configured as blowers or fans. There are disadvantages to such a system. In one example, as air filters within the system become clogged with debris, a higher static pressure within the air filtration system develops and the induction motor is unable to deliver a satisfactory airflow. However, with clean filters there is a low static pressure and the induction motor delivers a high airflow, perhaps more than desired for the application. In addition, when known air filtration systems are part of a Heating Ventilation and Air Conditioning (HVAC) system, which typically includes a blower or fan, air flow levels through the air filtration system portion of the HVAC system cannot be tracked with the air flow levels through the HVAC portion of the system. In such a system, where two blower motors are operating independently, air pressure differences and airflow problems throughout the system result.

It would be desirable to have an air filtration system where the amount of airflow in the air filtration system is controlled using a control system used to adjust the operation of the blower motor. In such a system it would be further desirable that the air filtration blower motor tracks the operation of a HVAC system blower motor. It would be further desirable to make air filtration systems more efficient by using variable speed motors as blowers rather than constant speed induction motors.

BRIEF SUMMARY OF THE INVENTION

The present invention is, in one aspect, a method for improving performance in an air filtration system. The method includes monitoring performance of a blower motor in the air filtration system and adjusting blower motor torque based upon the measured blower motor performance.

DETAILED DESCRIPTION OF THE INVENTION

Figure 1:
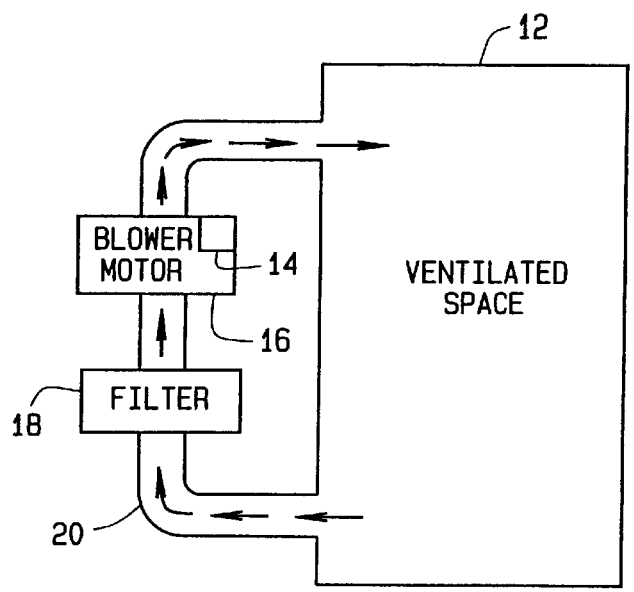
FIG. 1 is a drawing of one embodiment of an air filtration system.

FIG. 1 is a drawing of one embodiment of an air filtration system 10 configured to ventilate a space 12. Included in system 10 are a control system 14, a blower motor 16, a filter 18 and an air flow path 20. Control system 14 is configured with a microprocessor and memory containing a control program and is contained within motor 16. Motor 16 together with control system 14 are configured to maintain a constant airflow by varying the torque of blower motor 16 based upon sensed changes in motor speed due to pressure fluctuations in air flow path 20. Control system 14 is further configured to monitor air flow, static air pressure, temperature or any other parameter relative to ventilation.

Pressure and airflow through system 10 typically varies due to a level of clogging of filter 18. As stated above, control system 14 is configured to adjust torque of motor 16 to maintain a constant airflow through system 10. As filter 18 becomes clogged with dust and debris, maintaining a constant airflow through system 10 dictates an increase in the torque of blower motor 16. When filters 18 are replaced, pressures are reduced in system 10 and airflow through filter 18 is mostly unrestricted thereby necessitating a decrease in torque of motor 16 to maintain constant airflow in system 10. In an alternative embodiment, control system 14 is configured to adjust speed of blower motor 16 to maintain a constant air pressure in system 10. In another alternative embodiment, temperature is monitored in ventilated space 12 and motor 16 is configured to adjust speed to maintain a constant temperature in system 10.

Figure 2:
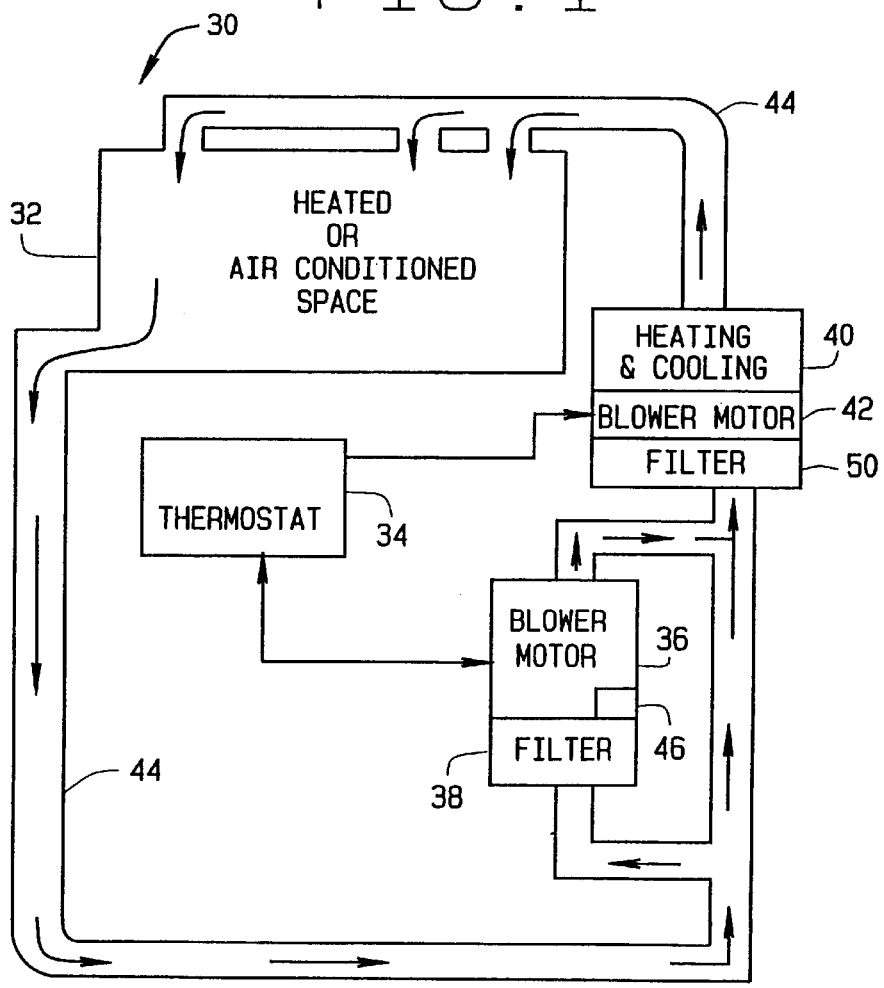
FIG. 2 is a drawing of one embodiment of a heating, ventilation and air conditioning (HVAC) system.

FIG. 2 is a drawing of one embodiment of a heating, ventilation and air conditioning (HVAC) system 30 configured to heat or cool a space 32. Included in system 30 are a thermostat 34, a blower motor 36, a filter 38, a heating and cooling source 40, a HVAC blower 42 and an air flow path 44. Motor 36 includes a motor controller 46 which is configured in one embodiment with a microprocessor and memory containing a control program. Motor controller 46 is further configured to maintain a constant airflow by varying torque of blower motor 36 based upon sensed pressure changes in airflow path 44. Such pressure changes are, in one embodiment, caused by a changing fan speed of HVAC blower 42. By sensing pressure changes, blower motor 36 is able to track the operation of HVAC motor 42. Motor controller 46 is also configured to be electrically connected to thermostat 34 which controls turning off and on of heating and cooling source 40. The selection of heating, cooling or fan only for heating and cooling source 40 using thermostat 34, implies a selection of fan speed for HVAC blower 42. Higher fan speeds are typically used for heating and cooling, while a lower fan speed is used for fan only to circulate air throughout system 30.

Another source of pressure and airflow changes in system 30 is due to a level of clogging of filter 38. In one embodiment, motor controller 46 is further configured to adjust the torque of motor 36 to maintain a constant airflow through system 30. As filter 38 becomes clogged with dust and debris, maintaining a constant airflow through system 30 dictates an increase in the torque of blower motor 36 which is set by controller 46. When filters 38 are replaced, pressures are reduced in system 30 and airflow through filter 38 is mostly unrestricted thereby allowing a decrease in motor speed as determined by controller 46. In either scenario, blower motor 46 continues to track operation of HVAC blower 42 to maintain constant airflow through system 30. Presence of a filter 50 at HVAC blower motor 42, does not affect operation as described above or below. Pressures due to filter 50 clogging are still a cause of blower motor 36 torque changes and cause blower motor torque increases or decreases to maintain constant airflow.

Thermostat 34, in one embodiment, is configured as a system controller. In such an embodiment, motor controller 46 is electrically connected to thermostat 34 and configured to receive information from thermostat 34 regarding operation and performance of system 30, as thermostat 34 controls operation of heating and cooling source 40 and HVAC blower motor 42. Therefore, thermostat 34 is configured to communicate to motor controller 46 whether system 30 is to be configured for heating, cooling, or for fan only. System 30 includes HVAC blower motor 42 which operates at higher speeds in a heating or cooling mode than when in a fan only mode. Blower motor 36 is configured to track operation of HVAC blower motor 42 to maintain a higher volume of air flow in system 30 when in a heating or cooling mode and a lower volume of air flow when in a fan only mode. Motor controller 46 can be configured for the monitoring of air flow, static air pressure, temperature or any other parameter relative to heating, ventilation and air conditioning.

In alternative embodiments, controller 46 is configured to adjust the speed of blower motor 36 to maintain a constant air pressure or a constant temperature in system 30. In another alternative embodiment, controller 46 and blower motor 36 are configured to monitor and maintain a constant motor torque.

Air flow control schemes, as described in FIGS. 1 and 2, facilitate determination of a useful life of filters for the environment of a particular application. By measuring airflow, or alternatively, a motor torque or air pressure required to maintain a constant airflow, it is determined when a filter 18 (shown in FIG. 1) or a filter 38 should be replaced. As a system such as system 10 or system 30 determines that a filter requires replacement, a user is notified. In one embodiment, such as the embodiment shown in FIG. 2, motor controller 46 is configured to notify thermostat 34, which is configured as a system controller, that a filter requires replacement. In alternative embodiments notification to the user are visual indicators, for example, a light emitting diode, or audio indicators, for example, a buzzer which are controlled by controllers 14 and 46 (shown in FIGS. 1 and 2 respectively).

Figure 3:
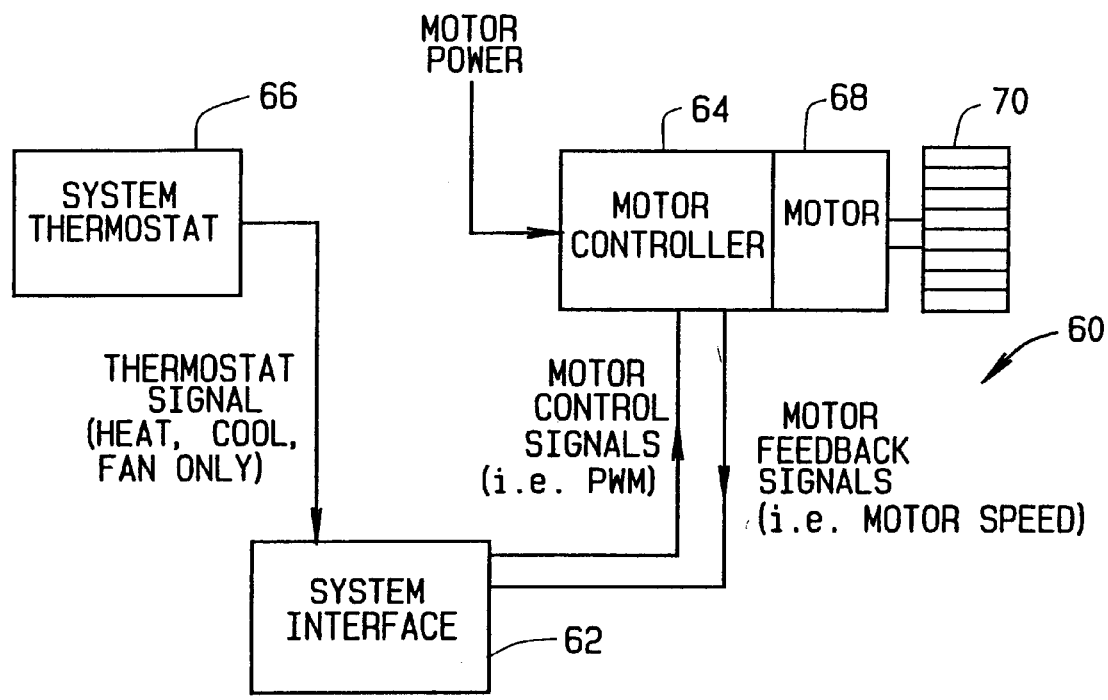
FIG. 3 shows an exemplary embodiment of a motor control system.

Blower motors 16 and 36 can be any electrical motor capable of varying torque or speed, such as an electronically commutated motor. FIG. 3 shows an exemplary embodiment of a motor control system 60 according to one embodiment of the present invention such as ventilation system 10 (shown in FIG. 1) or HVAC system 30 (shown in FIG. 2). System 60 includes an interface circuit 62 electrically connected to a motor controller 64 and a system thermostat 66. Motor controller 64 interprets information from interface circuit 62 and applies the interpreted operation information to motor 68 which operates a blower 70. Information from interface circuit 62 are motor control signals, in one embodiment, motor controller 64 is a pulse width modulation controller including a microprocessor (not shown) programmed to control an electronically commutated motor. In another embodiment, the motor is controlled by a 24 VAC signal. Motor controller 64 receives signals from interface circuit 62 and thereby controls an amount of pulse width modulation applied to motor 68. Motor controller 64 supplies motor status information to interface circuit 62 with motor feed back signals, for example, motor speed, motor torque, or airflow. Motor power signals 70 also are routed through controller 64.

Interface circuit 62 is controlled by system thermostat 66. In one embodiment, thermostat 66, is set to one of, for example, heat, cool, or fan only, The settings of thermostat 66 determine which signal or signals are applied to interface circuit 62, which in turn, determines the control signals sent from interface circuit 62 to motor controller 64 as described above.

The term microprocessor, as used herein, refers to microprocessors, microcontrollers, reduced instruction set circuits (RISC), application specific integrated circuits (ASIC), logic circuits, and any other circuit or processor capable of executing a program stored in memory.

While the invention has been described in terms of various specific embodiments, those skilled in the art will recognize that the invention can be practiced with modification within the spirit and scope of the claims.

What is claimed is:

1. A method for improving performance in an air filtration system, said method comprising the steps of:
    monitoring performance of a blower motor; and
    adjusting blower motor torque based upon the measured blower motor performance to maintain a substantially constant airflow through the air filtration system.

2. A method according to claim 1 wherein said step of monitoring performance of a blower motor further comprises the step of measuring changes in blower motor speed due to sensed pressure fluctuations within the air filtration system.

3. A method according to claim 1 further comprising the step of determining a useful life of an air filter based on an amount of blower motor torque utilized to maintain a constant airflow within the air filtration system.

4. A method according to claim 3 further comprising the step of notifying a user when the useful life of an air filter has passed.

5. A method according to claim 1 wherein said step of monitoring performance of the blower motor further comprises the step of measuring an air pressure in the air filtration system.

6. A method according to claim 1 wherein said step of adjusting blower motor torque further comprises the step of maintaining a constant air pressure in the air filtration system.

7. A method for maintaining a constant airflow in a heating and cooling system, the system including a heating and cooling source with a blower motor, an air filtration system including a blower motor, and a thermostat electrically connected to the heating and cooling source and the air filtration system, said method comprising the steps of:
    setting an air filtration blower motor speed based upon a heating and cooling blower motor speed;
    sensing pressure fluctuations within the heating and cooling system based upon changes to air filtration blower motor speed; and
    adjusting the air filtration blower motor torque to compensate for the pressure fluctuations in the heating and cooling system.

8. A method according to claim 7 wherein said step of setting an air filtration blower motor speed further comprises the step of selecting a heating and cooling blower motor speed at the thermostat.

9. A method according to claim 7 wherein said step of sensing pressure fluctuations further comprises the step of sensing pressure fluctuations based upon filter clogging.

10. A method according to claim 7 wherein said step of sensing pressure fluctuations further comprises the step of sensing pressure fluctuations based upon a change in selected heating and cooling blower motor speed.

11. An air filtration system comprising:
    a motor configured for use as a blower;
    an air flow path configured with filtration devices to filter the air; and
    a controller within said motor, said controller configured to monitor performance of the motor and adjust motor torque based upon the monitored performance to maintain a substantially constant airflow through the air filtration system.

12. A system according to claim 11 wherein said controller is configured to measure changes in blower motor speed due to pressure fluctuations within the air filtration system.

13. A system according to claim 11 wherein said controller is configured to determine a useful life of an air filter based on an amount of blower motor torque utilized to maintain a constant airflow within the air filtration system.

14. A system according to claim 13 wherein said controller is configured to notify a user when the useful life of an air filter has passed.

15. A system according to claim 11 wherein said controller is configured to measure an air pressure in the air filtration system.

16. A system according to claim 11 wherein said controller is configured to maintain a constant air pressure in the air filtration system.

17. A system according to claim 11 wherein said motor is an electronically commutated motor.

18. A heating, ventilation, and cooling system comprising:
   a heating and cooling source further comprising a blower motor;
   an air filtration system further comprising a blower motor including a controller configured to track said heating and cooling source blower motor;
   a thermostat electrically connected to said heating and cooling source and said heating and cooling source blower motor;
   an air flow path configured to contain both said heating and cooling source blower motor and said air filtration system blower motor and a space to be heated, cooled or ventilated; and
   at least one air filter located within said air flow path.

19. A heating, ventilation, and cooling system according to claim 18 wherein said air filtration system blower motor is an electronically commutated motor.

20. A heating, ventilation, and cooling system according to claim 18 wherein said air filtration system blower motor is configured to adjust motor torque based upon changes in the blower motor speed due to sensed pressure changes within said air flow path.

21. A heating, ventilation, and cooling system according to claim 18 wherein said air filtration blower motor torque is selected based upon a selected heating and cooling blower motor speed at the thermostat.

22. A heating, ventilation, and cooling system according to claim 18 wherein said air filtration blower motor is further configured to sense pressure fluctuations based upon clogging of said at least one air filter.

23. A heating, ventilation, and cooling system according to claim 18 wherein said air filtration blower motor is further configured to be electrically connected to said thermostat.

* * * * *